Patented Nov. 24, 1953

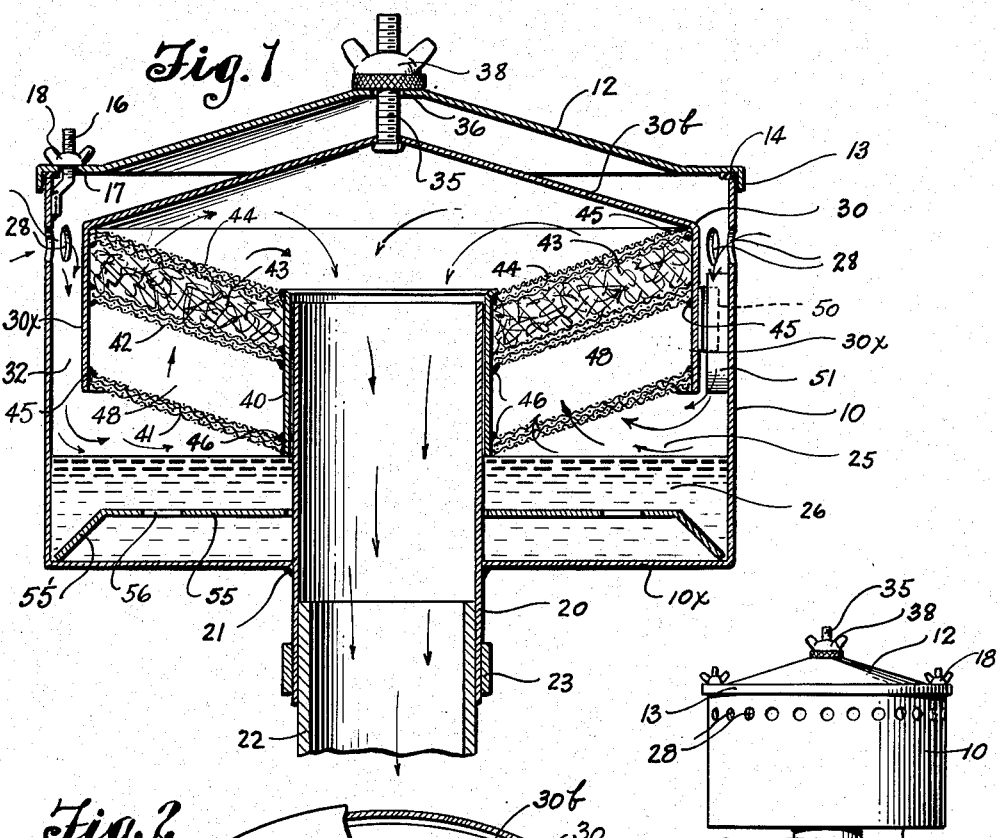
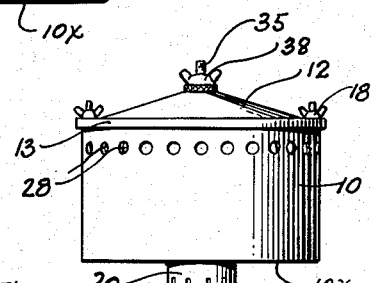
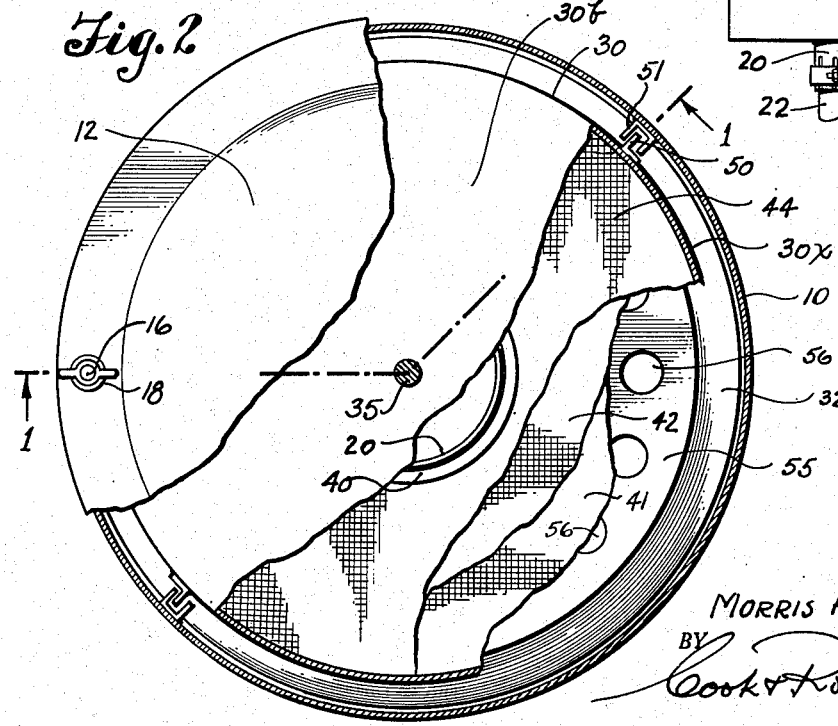

2,660,261

UNITED STATES PATENT OFFICE 2,660,261

AIR CLEANER

Morris H. Jeffrey, Seattle, Wash.

Application August 15, 1951, Serial No. 241,947

3 Claims. (Cl. 183—15)

This invention relates to devices which are generally known in the art and industry to which they pertain as "air cleaners." More particularly, the invention has to do with improvements in air cleaners that are designed for use in connection with the air intake manifolds of internal combustion engines, for the removal of dirt, dust and other harmful matter from the intake air prior to its entering the carburetor or prior to its being admitted to the combustion chambers of the engine. Furthermore, the present invention has reference to improvements in those general types of air cleaners that include a liquid containing sump, and various filters, baffles or other devices whereby the intaken air is caused to impinge with or to be washed by the sump liquid as a method of dirt and dust separation and collection.

It is the principal object of this invention to provide an air cleaner of the above stated character embodying certain novel improvements therein that render the device exceptionally effective and efficient for its intended uses; especially in its use with diesel type engines, although it is not the intent that the device be restricted to use with any particular type or make of engine but rather that it shall be used in connection with any air suction pipe where it is desirable that the intake air be cleaned or washed prior to its use.

It is a further object of this invention to provide an air cleaner of the above stated character wherein the air washing or filtering elements are contained in a housing that is in such relationship to the level of the liquid contained in the sump so that, through adjustment in elevation, the best possible results may be obtained in an engine regardless of its being a high compression or low compression engine.

A further object of the invention is to provide an air cleaner embodying air filters that are easy to remove as a unit for cleaning, and wherein provision is made for easy disposal of dirt laden liquid of the sump for a fresh supply when such is desired or necessary.

Yet another object of the invention is to provide an air cleaner that is of simplified construction; that is relatively inexpensive; that is readily applicable to engines of the conventional types and which has ample dirt holding capacity.

Further objects and advantages of the invention reside in the details of construction of parts; in their relationship and in their mode of use of the device as will hereinafter be fully described.

In accomplishing the above mentioned and various other objects of the invention, I have provided the improved details of construction, the preferred forms of which are illustrated in the accompanying drawings, wherein—

Fig. 1 is a central, vertical section of the present air cleaner as embodied in a preferred form of construction for its ordinary uses with an internal combustion engine.

Fig. 2 is a top, or plan view of the cleaner, with parts of various elements thereof broken away for explanatory purposes and a better understanding.

Fig. 3 is a side view on a reduced scale, of the present air cleaner as applied to what might be the air intake pipe of an internal combustion engine.

Referring more in detail to the drawings—

The air cleaning device of this invention, in its preferred form of construction, comprises a bowl or container having a body 10 of cylindrical form with horizontal bottom wall 10x. The upper end of the bowl is open, and over that end a lid or cover 12 is fitted and secured in an air sealed joint. The lid or cover 12 is formed with a depending, peripheral flange 13 that overlaps the top edge portion of the cylindrical body wall and a sealing gasket 14, of rubber or other suitable material is interposed between the top edge of the body and the cover as shown in Fig. 1, and the cover, is held securely in place by means of two or more attaching bolts 16 that are fixed vertically to the inside of the side walls of the bowl, and extend upwardly through holes 17 provided therefore in the lid, and which bolts have wing nuts 18 threaded thereonto for the clamping of the lid against the gasket in an air tight joint.

The lid 12 preferably is of conical form, and upwardly pointed, as shown in Figs. 1 and 3, thus to give additional space within the housing for the adjustably supported filter housing presently to be described.

Extending upwardly through the bottom wall 10x of the bowl 10 is an air outlet, and bowl mounting tube 20. This is disposed centrally and coaxially of the housing 10 and is soldered or welded to the bottom 10x in a leak tight joint, as indicated at 21. The lower end portion of the tube 20 projects to some distance below that wall 10x to serve as a mounting stem for the air cleaner. It is adapted to be fitted over or into the air intake pipe of an engine; such a pipe has been indicated at 22 in Figs. 1 and 3. This lower end of the tube 20 may be longitudinally split or corrugated for easy application to pipe 22 and a clamp collar 23, can be applied about the lower end of the tube for its fixed securement to the pipe 22. Also, the tube 20 extends upwardly, to substantial distance in the housing and is open at its top end.

The lower portion of the housing 10, surrounding the tube 20 provides a sump 25, or basin, in which a quantity of liquid 26, such as oil, can be held as has herein been shown for air washing and dirt and dust retaining purposes.

The air that passes through the cleaner and flows from its outlet tube 20 to the suction pipe 22 of the engine enters the housing 10 through a plurality of circular holes 28 that are formed in the side walls of the housing, in a circular row located near the top edge of the housing as shown best in Fig 3.

Contained within the housing 10, coaxially thereof, is a filter element, designated in its entirety by reference numeral 30. This element comprises an enclosing housing having a cylindrical body portion 30x, open at its lower end, and closed at its upper end by an upwardly pointed, conical top wall 30b. The cylindrical body portion 30x is of lesser diameter than the enclosing housing 10 and this provides an annular air passage 32 between them.

The filter element 30 is equipped at the apex of its top wall 30b with a vertical supporting stem 35 that extends freely through a hole 36 at the apex of the cover or lid 12 of the housing 10. A wing nut 38 is threaded onto the stem 35 to rest upon the lid about the opening 36 and this serves to adjustably suspend the filter in the housing 10. Disposed coaxially of the filter, but at a lower level than the body portion 30x, is a tubular guide 40 that loosely encircles the upper portion of the tube 20. The vertical height of the tube 40 is approximately equal to the height of wall 30x, and the tube 40 is fixedly supported in housing 30 by a plurality of vertically spaced, annular filter elements as shown in Fig. 1 and which are designated, respectively, by reference numerals 41, 42, 43 and 44.

The filter elements 41, 42 and 44 are of annular disk form, each comprising a plurality of superimposed layers of screen cloth of fine mesh preferably 100 mesh per inch. Each pack is about ⅛" thick, and the several screen filters, as thus provided are fixed in vertically spaced relationship, each being soldered or otherwise secured about its outer peripheral edge, as at 45 in Fig. 1, to the enclosing housing wall 30x and, likewise, they are secured, as at 46, to the tubular guide 40. Each pack of filter screens is of downwardly dished form as well shown in Fig. 1, sloping at about a 20° angle. The spacing of the filter elements 41 and 42 provides an air chamber 43 of substantial height between them. The elements 42 and 44 also are spaced apart but the space between them is filled with bronze or copper wool which constitutes the filter element designated by numeral 43.

As additional features of construction, I have equipped the filter housing 30x with vertical guide flanges 50, at opposite sides, designed for vertical guided travel in channel members 51 that are fixed to the inside wall surfaces of housing 10x. These parts keep the filter element from rotating in the housing but do not interfere with its vertical adjustments. Also, to prevent undue splashing of the oil or liquid, and to retain the settled dirt in the bottom portion of the bowl, I have disposed a baffle plate 55 in the sump 25. This plate is horizontally disposed about the center pipe 20 and has a downwardly inclined peripheral flange 55' whereby it is supported above the bottom wall 10x to substantial extent. The plate 55 has a number of relatively large holes 56 formed therein, providing for easy settlement therethrough of the collected dirt to the bottom of the sump.

To impart a better understanding of the size of the present device for ordinary uses, it will be said that it has been found to be quite practical to make the housing 10 about nine inches in diameter and its side walls about five inches high. The proportionate dimensions of the other parts of the device would be as seen in Figs. 1 and 2. These dimensions could be increased or decreased to meet various conditions but would generally retain the proportions shown.

Assuming the parts of the device to be so constructed and assembled, and the device applied to the air intake pipe 22 of an engine, or the like, it will be understood that when the engine is in operation outside air will be drawn into the housing 10 through the openings 28 and will then pass downwardly through space 32 between the side walls 10x of housing 10 and wall 30x of the filter and will come into direct impingement with the liquid body 26, then be deflected inwardly and sucked up through the several filter packs 41, 42, 43 and 44 to the dome chamber, then will turn downwardly and pass through tube 20 to the manifold 22 for use in the engine either as a part of the fuel mixture as supplied by a carburetor or as air taken directly into the explosion chamber.

The suction of air through the lower screen pack 41 draws oil from the sump up into the layers of screen cloth and makes it necessary for the air to pass through this oil, and be washed thereby. A certain amount of oil also is carried with the air stream and keeps the upper filter packs moistened to facilitate dust collection. In its passage through the various filter packs, the air becomes thoroughly washed and cleaned. Oil that is sucked up by the air stream into the filter packs constantly drips or flows back to the sump, carrying with it the dirt or dust that is collected. This settles to the bottom of the sump beneath the baffle plate 55 and is there retained so that the upper part of the body of oil will be kept substantially clean.

The particular advantage of the present device resides in the provision for making vertical adjustment of the filter member 30, toward or from liquid level, thus to best adapt the device to the varying conditions under which engines operate, and this can be readily and easily accomplished by the turning of nut 38.

The downward sloping of filter pack 41 makes it possible to seal off the lower end of tube 40 by lowering it into the oil by a downward adjustment of nut 38. However, this does not restrict the flow of air to the filter pack. The dishing or downward sloping of the pack 41 provides better contact of air and screens, and also induces drainage of oil from the screens to the center of the sump.

Such devices have proven to be highly efficient for keeping dirt, dust, etc. from the cylinders of engines of tractors operating in plowed field, or where dirt, dust, etc. is loose and blown by wind.

Having thus described my invention, what I claim as new therein and desire to secure by Letters Patent is:

1. An air cleaner of the character described comprising a closed outer housing providing a sump in its bottom portion with liquid contained therein to substantial depth, and there being air inflow ports in the housing walls near its upper end, an air outflow tube extended from within the housing at a level substantially above the sump, downwardly through the sump and from the housing for delivery of cleaned air to a point of use, a filter housing of inverted bowl-like form enclosed in said outer housing with clearance between their side walls to define an annular air passage leading downwardly between them from said air inflow ports to the surface of liquid in the sump, and surrounding the inner end portion of the air outflow tube with substantial clearance and spaced above the sump, and providing a closed chamber within its upper portion that is in direct communication with said air outflow tube, and air filtering element contained in the lower end entrance to the filter housing between its side walls and the air outflow tube, and inclined downwardly and inwardly from the lower edge of the side walls to define a gradually constricted air passage continuing from the annular passage and leading to the filtering elements across the surface of the sump liquid and means for adjusting the filter housing vertically to cause the filtering element to be immersed in the sump liquid to more or less extent.

2. An air cleaner as recited in claim 1 wherein a guide sleeve is slidably fitted about the inner end portion of the air outflow tube, and said filter elements as applied to the lower end of the filter housing are fixed to the housing walls and to said sleeve; said sleeve being extended below the level of the periphery of the filter housing, for projection below the surface of liquid in the sump thus to seal the joint between sleeve and tube against inflowing air.

3. An air cleaner comprising an outer housing of bucket-like form, a cover fitted over the top end thereof and formed with a central hole, and there being air inflow ports in the side walls of the housing near the top, and said housing providing a liquid containing sump in its bottom portion containing liquid to substantial depth, an air outflow tube extended vertically through the bottom of the housing to substantially above the level of liquid in the sump, a filter housing of inverted bowl-like form enclosed in the outer housing with clearance between their wall providing an annular air inflow passage between them leading downwardly from the air inflow ports to the surface of liquid in the sump, a sleeve slidably fitted to the upper end portion of the air outflow tube and extended below the level of the outer periphery of the filter housing, air filtering screens extended between the side walls of the filter housing and upper portion of the sleeve, another filter screen extended in a downwardly and inwardly sloping direction from the lower peripheral edge of the filter housing to the lower end portion of the sleeve, a supporting bolt for the filter housing fixed to the top thereof and extended through the hole in the cover, and a supporting nut threaded on the bolt for supporting the filter housing from the top of the outer housing, and adjustable along the bolt to raise or lower the filter housing relative to the level of liquid in the sump; said downwardly and inwardly sloping screen being immersed in the sump liquid to more or less extent in accordance with the adjustment of the filter housing.

MORRIS H. JEFFREY.

References Cited in the file of this patent

UNITED STATES PATENTS

| Number | Name | Date |
| --- | --- | --- |
| 2,083,649 | Heglar | June 15, 1937 |
| 2,240,042 | Kelsey | Apr. 29, 1941 |
| 2,297,934 | Baily | Oct. 6, 1942 |

FOREIGN PATENTS

| Number | Country | Date |
| --- | --- | --- |
| 603,846 | Great Britain | June 24, 1948 |